Patented Sept. 24, 1929

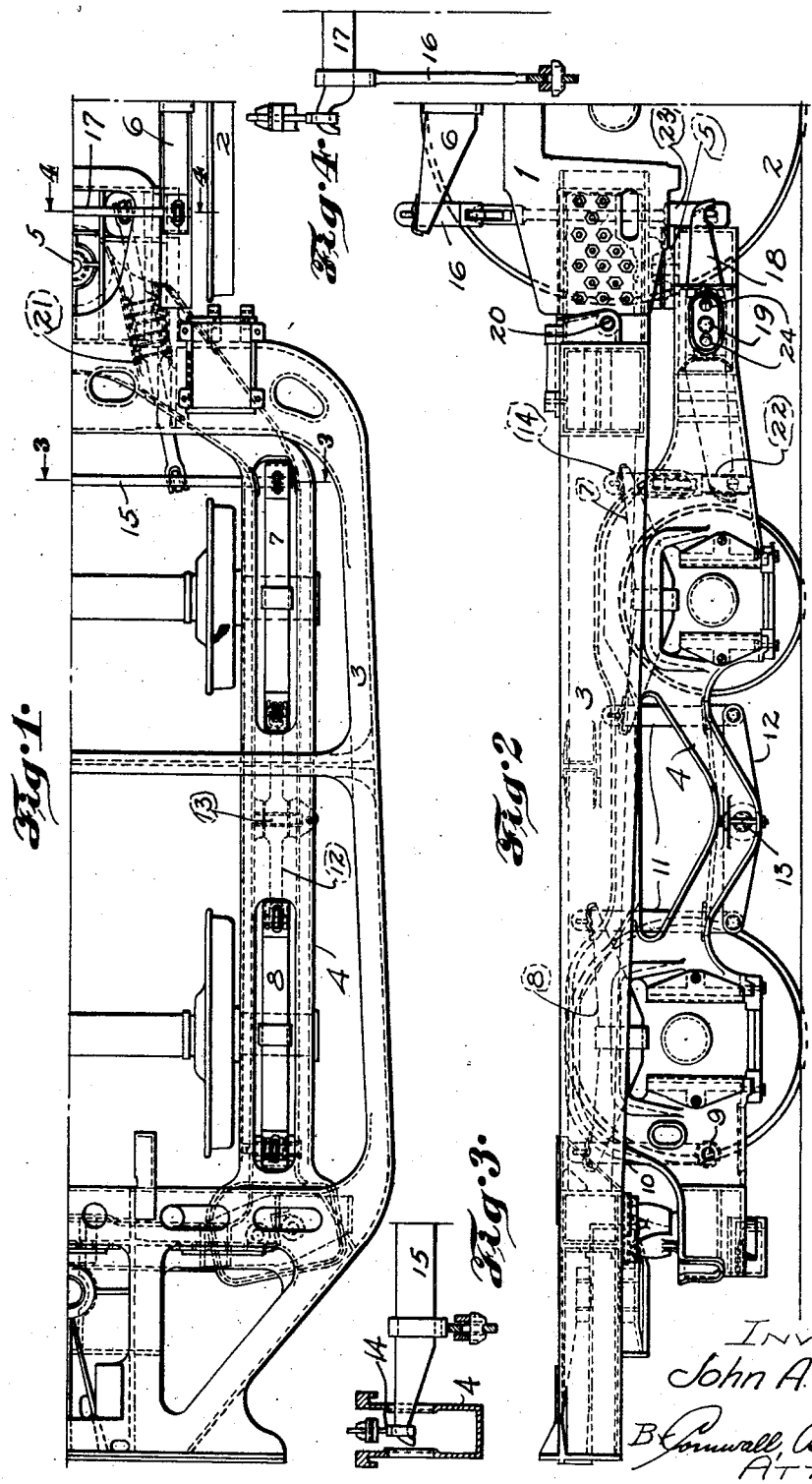

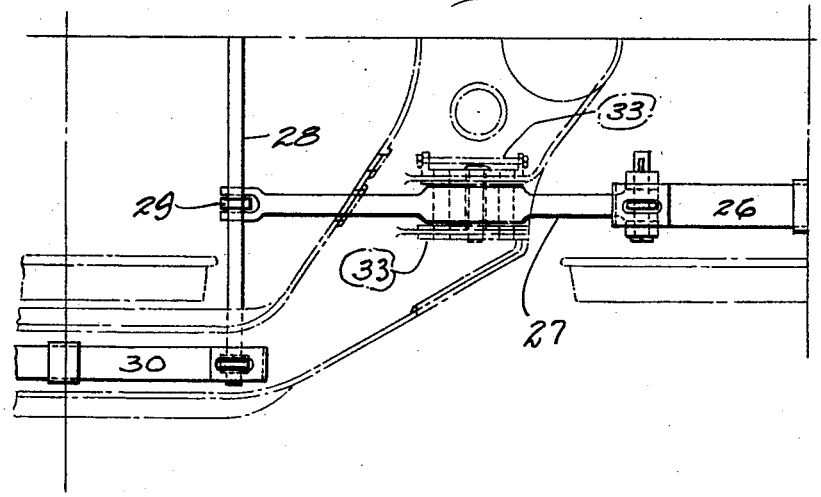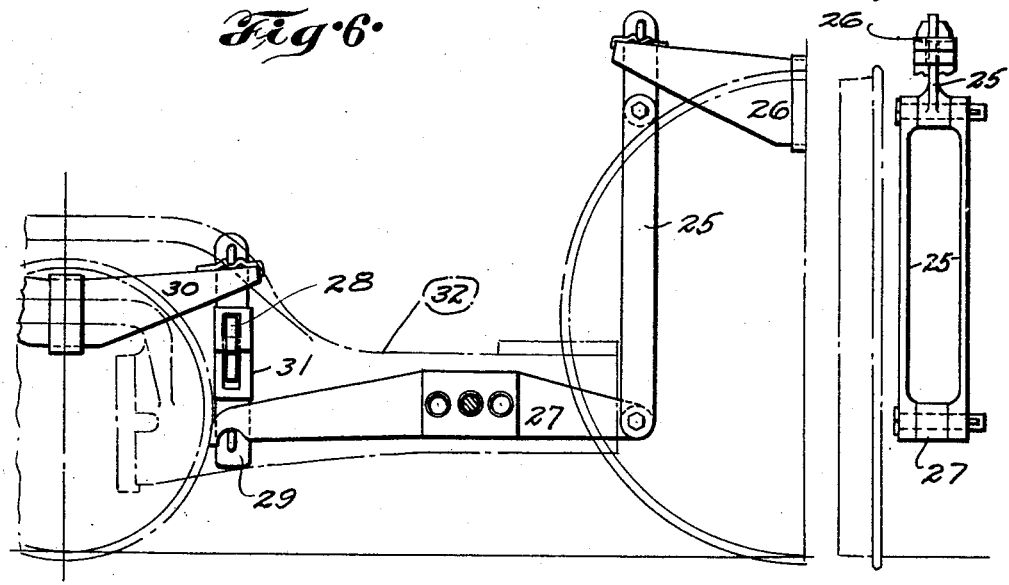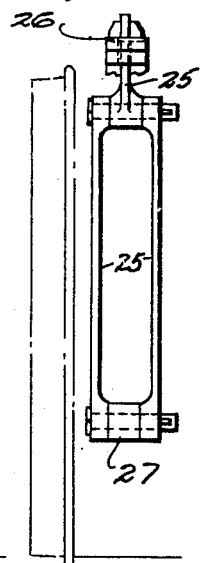

1,729,588

UNITED STATES PATENT OFFICE

JOHN A. McCORMICK, OF ST. LOUIS, MISSOURI, ASSIGNOR, BY MESNE ASSIGNMENTS, TO GENERAL STEEL CASTINGS CORPORATION, OF GRANITE CITY, ILLINOIS, A CORPORATION OF DELAWARE

LOCOMOTIVE SPRING RIGGING

Application filed March 3, 1928. Serial No. 258,825.

My invention relates to railway rolling stock and consists in a novel arrangement of the spring equalizing system of a locomotive in which the main spring system over the driver wheels is part of a system which includes the springs over one or more trailer axles.

The springs over the driver wheels are always located between the drivers, and the truck trailer axle springs are usually located outside of the wheel tread, hence, the two sets of springs are out of longitudinal alignment. It has been customary to suspend one end of an equalizer from the rear end of the rear driver spring and to suspend the other end of the same equalizer from the front end of the front trailer axle spring, the intermediate part of the equalizer being fulcrumed on the locomotive bed or on the truck frame.

Due to the proximity of the front end of an equalizer, thus suspended, to the rear brake head of the rear driver it is often difficult to provide clearance between the equalizer and brake head and to fulcrum the equalizer at the most desirable point.

The object of my invention is to so mount the equalizer as to better provide for clearance between the same and the brake rigging.

In the accompanying drawings which illustrate a selected embodiment of my invention—

Figure 1 is a top view of one longitudinal half of a four-wheel locomotive truck frame showing the adjacent driver and associated parts.

Figure 2 is a side elevation of the same structure shown in Figure 1.

Figure 3 is a transverse section taken on line 3—3 of Figure 1.

Figure 4 is an elevation of the equalizer arrangement adjacent the rear driver, the elements illustrated being sectioned in part to more clearly illustrate their assembly.

Figures 5 and 6 are largely diagrammatic and respectively illustrate top and side views of a modified form of my invention which will be described later.

Figure 7 is an elevation of the locomotive driver and equalizer assembly indicated in Figures 5 and 6.

The rear end of the locomotive main frame is indicated at 1 and the rear driver at 2. The locomotive cradle is shown at 3 and the trailer truck frame is indicated at 4, the same being pivoted at 5 to a suitable cross member on the locomotive cradle. A portion of the rear driver spring is shown at 6 and the springs mounted on the journal boxes of the trailer axles are indicated at 7 and 8, respectively. The truck spring system is anchored to the truck frame at 9 by link 10 and the adjacent ends of the truck springs are connected by links 11 to an equalizer 12 fulcrumed on the truck frame at 13. Links 14 on opposite sides of the truck suspend a transverse equalizer 15 from the front ends of the truck springs 7. Links 16 on the rear ends of the locomotive springs 6 suspend a similar transverse equalizer 17. The equalizer connecting the truck spring and main spring systems is indicated at 18 and is fulcrumed to the truck frame at 19 and its ends are supported from cross equalizers 15 and 17 by suitable hangers 22 and 23, respectively. This equalizer 18 is located far enough from brake hanger brackets 20, which are provided on the cradle, so that there will be no interference between the equalizer and brake heads suspended from the hanger.

In order to provide maximum stability and permit the use of a minimum size of equalizer, it is desirable for the rear end of equalizer 18 to be located as near as possible to the end of springs 7, and I show the equalizer inclined at an angle to the longitudinal center line of the locomotive so as to bring its rear end as far as possible from the center line.

Preferably the truck frame is formed of a one-piece casting with integral pedestals and integral elements 21 forming fulcrum bearings and a housing for the central portion of the equalizer 18. These elements are inclined to the longitudinal center line of the locomotive and approximately determine the angle of inclination of the equalizer so that the links 22 and 23 will be properly located on the cross bars 15 and 17. Since the elements 21 are located well away from the brake head and shoe it is possible to make them long enough to provide additional fulcrum bearings 24 to be used in case it is desired to vary the distribution of load to either set of springs.

In the modified structure illustrated in Figures 5 and 6, the cross equalizer on the driver springs is eliminated and a hanger 25 is suspended directly from the end of the driver spring 26 and supports the front end of the equalizer 27. The rear end of equalizer 27 is suspended from a cross equalizer 28 by means of hangers 29 and cross equalizer 28 is suspended from the truck springs 30 by suitable links 31 similar to the arrangement shown in my preferred structure. The equalizer is fulcrumed on the truck frame 32, the latter being provided with integral fulcrum brackets 33 which are disposed parallel with the longitudinal center line of the locomotive.

In each form of my invention each wheel piece of the truck frame includes spaced side walls and the truck springs are located between these walls. These side walls are provided with openings, as best shown in Figure 3, to permit the insertion therethrough of the cross bar. It will be noted that the opening in the inner wall must be large enough to permit vertical movement of the cross bar produced by play of the spring upon which it is mounted. My invention permits the equalizer connecting the truck and main springs to be positioned so as to clear the brake rigging or other equipment without undue limitation because of the location of the ends of the springs on which the equalizer is to be suspended.

Obviously modifications in the details of my invention other than those shown may be made without departing from the spirit thereof and I contemplate the exclusive use of such variations as fall within the scope of my claims.

I claim:

1. In a locomotive trailer truck, a frame member extending from the side of the truck towards the longitudinal center line of the same, and an equalizer extending across said member diagonally of the longitudinal center line of the truck and fulcrumed on said member.

2. In a locomotive trailer truck, a frame member and an equalizer for connecting the truck and driver spring system, said equalizer extending diagonally of the longitudinal center line of the truck and being fulcrumed to said frame with its ends located inside of the wheel tread.

3. In a locomotive trailer truck, wheels, truck frame supporting springs on opposite sides of the truck and outside of the wheel tread, a cross bar mounted on the forward ends of said springs, a truck frame, and equalizers fulcrumed on said frame inside of the wheel tread and having their rear ends farther apart than their fulcrums and supported on said cross bar.

4. In a locomotive trailer truck, a frame including wheel pieces each having spaced side walls, truck springs located between the side walls of said wheel pieces, a cross bar extending through the inner side walls of said wheel pieces adjacent to and supported by said springs, and equalizers suspended from said cross bar between said wheel pieces and extending forwardly for connection to the locomotive driver springs.

5. In a locomotive trailer truck, a frame including wheel pieces each having spaced side walls, truck springs located between the side walls of said wheel pieces, a cross bar extending through the inner side walls of said wheel pieces and supported by said springs, and equalizers mounted on said cross bar between said wheel pieces and extending forwardly and inwardly for connection to the locomotive driver springs.

6. In a locomotive trailer truck, a frame including wheel pieces each having spaced side walls which converge to form a pivotal connection to the locomotive frame, there being equalizer fulcrum elements on the converging portions of said wheel pieces, truck springs located between the side walls of said wheel pieces, a cross bar extending through the inner side walls of said wheel pieces adjacent to the ends of said springs and supported by said springs, and equalizers fulcrumed on said elements and each having a rear end suspended from said cross bar between said wheel pieces and each extending forwardly for connection to the locomotive spring system.

7. A locomotive driver spring and truck spring connection comprising respective cross bars for the said driver springs and truck springs, and equalizers inclined rearwardly and outwardly from said driver springs and supported at their ends on said cross bars and being fulcrumed between their ends on the trailer truck.

8. A locomotive driver spring and trailer truck spring connection comprising a cross bar for the rear driver springs, a cross bar for the front truck springs, equalizers inclined rearwardly and outwardly from said driver springs and supported at their respective ends on said cross bars.

9. In a locomotive, a main frame member, a truck frame member, laterally spaced driver springs supporting said main frame, a cross bar mounted on said springs, laterally spaced truck springs supporting said truck frame, a cross bar mounted on said truck springs, equalizers each having one end supported on said first-mentioned cross bar between said driver springs and each extending rearwardly and outwardly therefrom and having its other end supported on said second-mentioned cross bar.

10. In a locomotive, a main frame member, a truck frame member, laterally spaced driver springs supporting said main frame, a cross bar mounted on said springs, laterally spaced truck springs supporting said truck frame, a cross bar mounted on said truck springs, equalizers each having one end supported on said first-mentioned cross bar between said driver springs and each extending rearwardly and outwardly therefrom and having its other end supported on said second-mentioned cross bar, and each fulcrumed between its ends on said truck frame member.

In testimony whereof I hereunto affix my signature this 27th day of February, 1928.

JOHN A. McCORMICK.